(12) United States Patent
Ramsauer

(10) Patent No.: US 10,894,615 B2
(45) Date of Patent: Jan. 19, 2021

(54) PASSENGER BOARDING BRIDGE

(71) Applicant: Dieter Ramsauer, Schwelm (DE)

(72) Inventor: Dieter Ramsauer, Schwelm (DE)

(*) Notice: Subject to any disclaimer, the term of this patent is extended or adjusted under 35 U.S.C. 154(b) by 0 days.

(21) Appl. No.: 16/771,398

(22) PCT Filed: Nov. 2, 2018

(86) PCT No.: PCT/EP2018/079966
§ 371 (c)(1),
(2) Date: Jun. 10, 2020

(87) PCT Pub. No.: WO2019/115088
PCT Pub. Date: Jun. 20, 2019

(65) Prior Publication Data
US 2020/0377227 A1    Dec. 3, 2020

(30) Foreign Application Priority Data

Dec. 15, 2017   (DE) .................... 20 2017 107 637 U

(51) Int. Cl.
*B64F 1/305*   (2006.01)
*E01D 15/12*   (2006.01)

(52) U.S. Cl.
CPC ............ *B64F 1/305* (2013.01); *E01D 15/124* (2013.01)

(58) Field of Classification Search
CPC .............................. B64F 1/305; E01D 15/124
USPC ........................................................ 14/71.5
See application file for complete search history.

(56) References Cited

U.S. PATENT DOCUMENTS

| | | | |
|---|---|---|---|
| 5,704,086 A | 1/1998 | Hansen et al. | |
| 6,055,692 A | 5/2000 | Pell et al. | |
| 6,122,789 A * | 9/2000 | Stephenson | B64F 1/3055 14/71.1 |
| 6,212,724 B1 * | 4/2001 | Zhou | B64F 1/3055 14/69.5 |
| 6,330,726 B1 * | 12/2001 | Hone | B64F 1/305 14/69.5 |
| 6,543,076 B1 | 4/2003 | Worpenberg et al. | |
| 2002/0138924 A1 * | 10/2002 | Rolfe | B64F 1/305 14/71.5 |
| 2003/0229955 A1 * | 12/2003 | Savage | B64F 1/3055 14/71.5 |

FOREIGN PATENT DOCUMENTS

| | | |
|---|---|---|
| DE | 19911879 C1 | 8/2000 |
| DE | 10201724 A1 | 7/2003 |

(Continued)

*Primary Examiner* — Raymond W Addie
(74) *Attorney, Agent, or Firm* — The Webb Law Firm

(57) ABSTRACT

The innovation relates to a passenger boarding bridge which contains at least one stationary segment and at least one movable segment, in particular a plurality of segments movable relative to one another, wherein each segment has wall, floor and roof elements, and, in the transition region of individual segments, transition element, which are possibly extending at an angle, are provided on the floor side, characterized in that safely elements formed in the manner of railings are provided in wall-side sections of the wall elements of the segments and are positioned on the wall-side sections of the individual segments in such a way that a relative movement of the segments with respect to one another can be carried out unimpeded.

6 Claims, 2 Drawing Sheets

(56) References Cited

FOREIGN PATENT DOCUMENTS

| | | | | |
|---|---|---|---|---|
| JP | 2004-276703 | * 10/2004 | .............. | B64F 1/305 |
| WO | 9724491 A1 | 7/1997 | | |
| WO | 9838090 A1 | 9/1998 | | |

* cited by examiner

PASSENGER BOARDING BRIDGE

CROSS-REFERENCE TO RELATED APPLICATIONS

This application is the United States national phase of International Application No. PCT/EP2018/079966 filed Nov. 2, 2018, and claims priority to German Patent Application No. 20 2017 107 637.7 filed Dec. 15, 2017, the disclosures of which are hereby incorporated by reference in their entirety.

BACKGROUND OF THE INVENTION

Field of the Invention

The invention relates to a passenger boarding bridge which contains at least one stationary and at least one, in particular a plurality of segments movable relative to one another, wherein each segment has wall, floor and roof elements and transition elements, which are running optionally at an angle, are provided on the floor side in the transition region of individual segments.

Description of Related Art

DE 199 11 879 C1 discloses a jetbridge cabin with a canopy and a floor extending over the entire width of the canopy. In the case of such a jetbridge cabin, which is suitable for docking both on conventional passenger aircrafts and commuter aircrafts, the undivided floor region of its lateral edge should have a railing and should be displaceable together with said railing transverse to the opening of the canopy under its side wall.

A stationary passenger boarding bridge is made known by DE 102 01 724 A1 for handling passengers and/or freight at the bow door of parked forwards regional or commuter aircrafts of identical or similar families, consisting of a fixed walkway connected to the terminal at the ground level with a floor continuously rising towards the aircraft and a bridge head movable towards the aircraft in three directions, whose telescopable part can be virtually completed retracted into the fixed walkway in the park position of the passenger boarding bridge.

Passenger boarding bridges, which depart either from a section of a building or are arranged on the airfield are subject to seasonal weather influences.

Liquids leaking through the roof of individual segments of the passenger boarding bridge are particularly problematic, which in particular in the floor region of the segment(s) could lead to moisture penetration of the floor or, if present, of a floor cover or to the formation of puddles on the floor. The same applies to the formation of condensate in the tunnel, caused by different outer and inner temperatures. In combination with strongly sloping passenger boarding bridges, via which smaller aircraft can be reached, there may be a high risk potential for persons passing through the tunnel of the passenger boarding bridge, caused by the risk of slipping or slippery conditions.

The object of the subject matter of the invention is to further develop a passenger boarding bridge according to the preamble of the first claim so that the indicated risk potential can be largely addressed.

SUMMARY OF THE INVENTION

The object is achieved with a passenger boarding bridge according to the preamble in that safety elements formed in the manner of railings are provided in wall-side sections of the wall elements of the segments which are positioned on the wall-side sections of the individual segments such that a relative movement of the segments towards one another can be carried out unimpeded.

Advantageous further developments of the subject matter of the invention can be inferred from the dependent claims.

The term railing is understood by the person skilled in the art as fall supports or person guide elements. Preferred materials are wood, plastic or metal.

Advantageously, the safety elements formed in the manner of railings are arranged on both wall-side sections of the wall elements at a suitable height relative to the respective floor element so that persons, who pass through the tunnel of the individual segments, can hold on here without problems.

In the case of the segment facing an aircraft transition area, the safety elements can be fixedly connected directly to associated wall-side sections of the respective segment.

For the segment(s) movable in its/their longitudinal direction and adjoining this segment located at the aircraft transition area, different solution possibilities lend themselves for positioning the safety elements formed in the manner of railings.

On the one hand, there is the possibility that each further segment is provided with a region running in the direction of the respectively successive segment and forming a wall-side narrowed portion, on which region is fastened the respective safety element formed in the manner of railings.

Alternatively, there is the possibility that each further movable segment has a region running in the direction of the respectively successive segment and forming a wall-side bulged portion, within which is fastened the respective safety element.

Both alternatives ensure that a seamless relative movement of the individual segments towards one another is ensured.

The subject matter of the invention is represented in the drawing on the basis of an exemplary embodiment and is described as follows, in which

DESCRIPTION OF THE INVENTION

Figure 1:
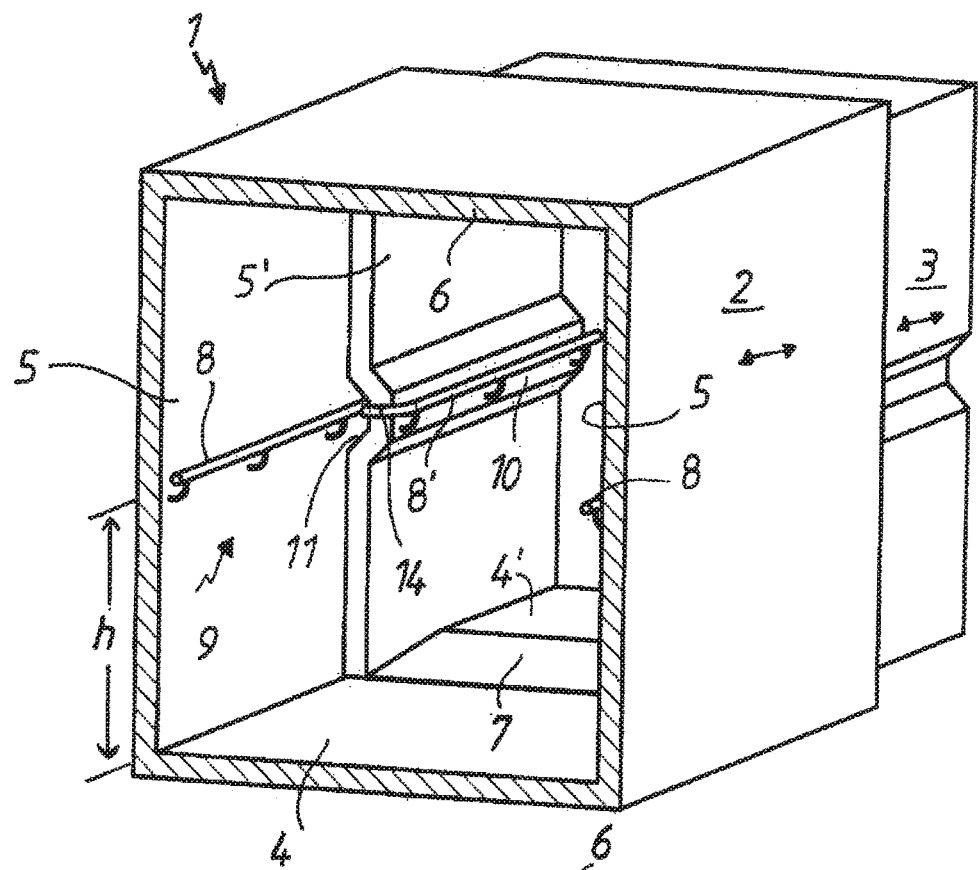
FIGS. 1 and 2 are different embodiments of the subject matter of the invention in different views.
Figure 1:
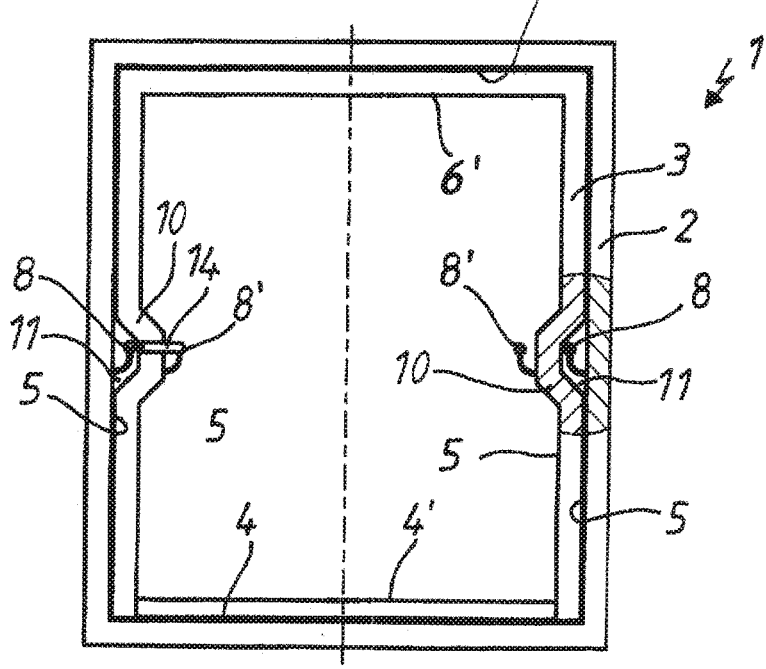
Figure 2:
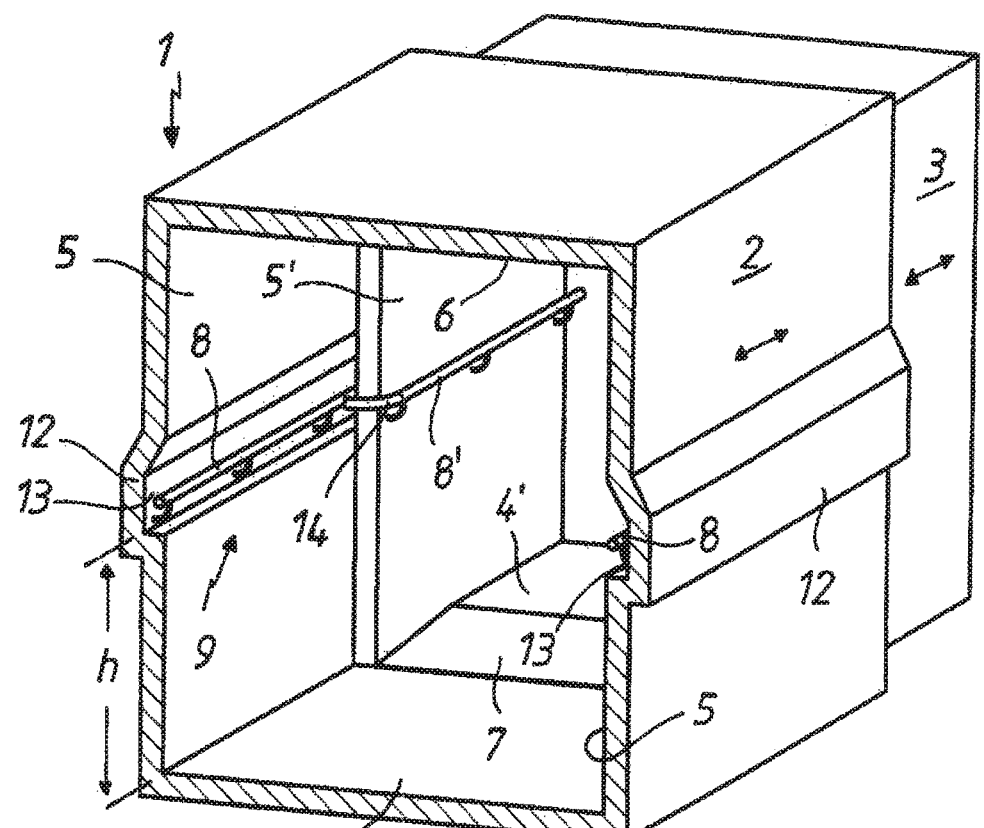
Figure 2:
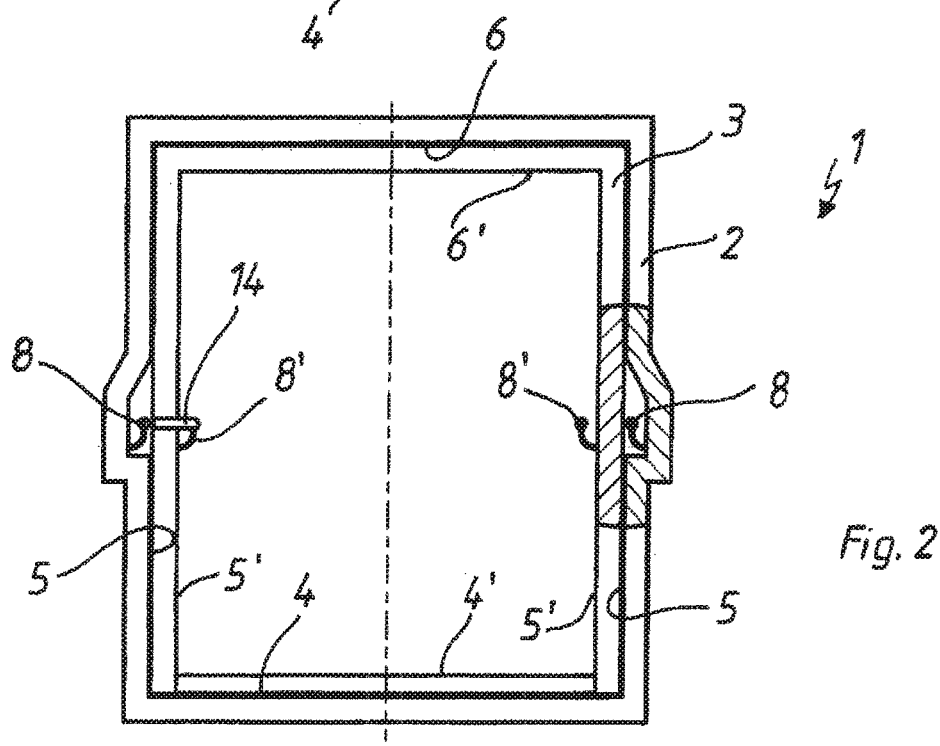

FIGS. 1 and 2 show parts of a passenger boarding bridge 1. In the figures, only the relevant parts concerning the passenger boarding bridge 1 are represented. In relation to other parts of a passenger boarding bridge, reference is made to the prior art, said parts can be assigned in an analogous manner to the passenger boarding bridge 1 according to the invention.

Since substantially identical parts are described in FIGS. 1 and 2, the same reference numerals apply for both figures, where appropriate.

The passenger boarding bridge 1 according to FIGS. 1 and 2 are formed by individual segments 2, 3 which are movable relative to one another in the direction of the arrow. Parts assigned to the passenger boarding bridge 1, such as stationary segments, aircraft transition regions or the like are not represented here for better clarity. Each segment 2, 3 is formed by floor elements 4, 4', wall elements 5, 5' and roof elements 6, 6'. A transition element 7 extends between the merely indicated segments 2, 3, which, in this example, adopts a contour inclined downwards.

Depending on the configuration of the passenger boarding bridge, this may also be provided in reverse order. At a predefinable height h (wall-side section), the respective wall elements 5, 5' are provided according to the invention with safety elements 8, 8' formed in the manner of railings.

In order to allow unimpeded movement of the individual segments 2, 3 and if necessary of successive segments not represented, FIGS. 1 and 2 show different embodiments.

In FIG. 1, the segment 2 facing an aircraft transition area not represented in further detail is provided with the safety element 8 such that the same is fastened directly on a wall section 9 at the height h already indicated. Depending on the configuration of the safety element 8, brackets or the like may be used here as fastening means. In the case of the segment 3 adjoining the segment 2, the associated wall element 5' is provided with a kind of narrowed portion 10. The safety element 8' provided here and formed in the manner of railings is fastened in an analogous manner on the inner region of the narrowed portion 10 via fastening means. It can be inferred from the representations that the safety element 8 formed in the manner of railings can dip in the cavity 11 of the successive segment 3 so that a seamless relative movement of the two segments 2, 3 towards one another is possible. This embodiment of the segments 2 and 3 can also then be continued if necessary via further segments (not represented).

FIG. 2 shows an alternative to FIG. 1. In this example, the segment 2 should be provided with a bulged portion 12. This affects both wall elements 5. The safety element 8 already mentioned and formed in the manner of railings is also provided here on the associated wall section 9 at the predefinable height h, said safety element is now fastened in the cavity 13 of the bulged portion 12 via auxiliary means, unlike FIG. 1.

In both figures, railing parts 14 formed in an arch-like manner are provided in the transition regions of the segments 2, 3 such that it is possible for the persons passing through the passenger boarding bridge 1 to go from safety element 8' to safety element 8 without problems.

FIGS. 1 and 2 represent merely exemplary embodiments of the subject matter of the invention.

Any other embodiment, which allows the relative movement of the segments 2 and 3 towards one another, is also covered by the subject matter of the invention.

LIST OF REFERENCE NUMERALS 1 passenger boarding bridge
2 segment
3 segment
4 floor element
4' floor element
5 wall element
5' wall element
6 roof element
6' roof element
7 transition element
7' transition element
8 safety element formed in the manner of railings
8' safety element formed in the manner of railings
9 wall section
10 narrowed portion
11 cavity
12 bulged portion
13 cavity
14 railing part
h height

The invention claimed is:

1. A passenger boarding bridge containing at least one stationary and at least one, in particular a plurality of segments movable relative to one another, wherein each segment has wall, floor and roof elements and transition elements, are provided on the floor side in the transition region of individual segments, wherein safety elements formed in the manner of railings are provided in wall-side sections of the wall elements of the segments, said safety elements are positioned on the wall-side sections of the individual segments such that a relative movement of the segments towards one another can be carried out unimpeded, characterised in that individual or a plurality of further segments has/have a region running in the direction of the respectively successive segment and forming a narrowed portion, on which region the respective safety element is fastened, or individual or a plurality of the successive segments has/have a region running in the direction of the respectively successive segment and forming a bulged portion, inside of which region the respective safety element is fastened.

2. The passenger boarding bridge according to claim 1, characterised in that the safety elements formed in the manner of railings are arranged on both wall-side sections of the wall elements.

3. The passenger boarding bridge according to claim 1, characterised in that in the case of the segment facing an aircraft transition area, the safety elements are fixedly connected directly to associated wall-side sections of the respective segment.

4. The passenger boarding bridge according to claim 1, characterised in that railing parts formed in an arc-like manner are provided in the transition regions of individual segments.

5. The passenger boarding bridge according to claim 1, characterised in that the safety element formed in the manner of railings consists of wood, plastic or metal and can be fixed on the associated wall section via fastening means.

6. The passenger boarding bridge according to claim 1, characterized in that the transition elements are running at an angle.

* * * * *